United States Patent
Bovington et al.

(10) Patent No.: US 9,946,025 B2
(45) Date of Patent: Apr. 17, 2018

(54) REMOVABLE OPTICAL TAP FOR IN-PROCESS CHARACTERIZATION

(71) Applicant: Oracle International Corporation, Redwood Shores, CA (US)

(72) Inventors: Jock T. Bovington, La Jolla, CA (US); Ashok V. Krishnamoorthy, San Diego, CA (US); Patrick J. Decker, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 29 days.

(21) Appl. No.: 15/216,159

(22) Filed: Jul. 21, 2016

(65) Prior Publication Data
US 2018/0024297 A1    Jan. 25, 2018

(51) Int. Cl.
*G02B 6/34* (2006.01)
*G02B 6/28* (2006.01)
(Continued)

(52) U.S. Cl.
CPC .......... *G02B 6/2852* (2013.01); *G02B 6/122* (2013.01); *G02B 6/1221* (2013.01);
(Continued)

(58) Field of Classification Search
CPC .......... G02B 2006/12061; G02B 6/122; G02B 6/2852; G02B 6/1221; G02B 6/1228; G02B 6/29338; G02B 6/29395; G02B 6/34

See application file for complete search history.

(56) References Cited

U.S. PATENT DOCUMENTS

2005/0110108 A1*  5/2005  Patel .................. G02B 6/12004
                                                        257/453
2009/0065682 A1*  3/2009  Webster ............... G02B 6/1228
                                                        250/208.2
(Continued)

OTHER PUBLICATIONS

Topley, R., et al., "Planar surface implanted diffractive grating couplers in SOI", Optics Express, Jan. 13, 2014, vol. 22, No. 1, pp. 1077-1084.
(Continued)

*Primary Examiner* — Thomas A Hollweg
*Assistant Examiner* — Mary A El Shammaa
(74) *Attorney, Agent, or Firm* — Park, Vaughan, Fleming & Dowler LLP

(57) ABSTRACT

An integrated circuit includes optical waveguides defined in a semiconductor layer, and uses removable optical taps to allow for in-process characterization and trimming. These optical waveguides may be trimmed during fabrication of the integrated circuit to improve performance. Note that the trimming may modify indexes of refraction of portions of the optical waveguides or may involve a more invasive process. Moreover, the trimming may exclude or may not involve the use of a polymer and/or the carrier wavelengths at a given temperature may be stable as a function of time. The trimming process may use removable optical taps for external feedback to determine the amount of change required. These optical taps may be formed either in the semiconductor layer or the cladding layer, and they may be disabled with negligible impact to device performance via alterations to the cladding layer after the completion of trimming.

20 Claims, 11 Drawing Sheets

(51) Int. Cl.
*G02B 6/122* (2006.01)
*G02B 6/293* (2006.01)
*G02B 6/12* (2006.01)

(52) U.S. Cl.
CPC ....... *G02B 6/1228* (2013.01); *G02B 6/29338* (2013.01); *G02B 6/29395* (2013.01); *G02B 6/34* (2013.01); *G02B 2006/12061* (2013.01)

(56) References Cited

U.S. PATENT DOCUMENTS

| | | | |
|---|---|---|---|
| 2015/0253501 A1* | 9/2015 | Li | G02B 6/125 385/14 |
| 2015/0277053 A1* | 10/2015 | Zheng | G02B 6/29341 385/31 |

OTHER PUBLICATIONS

Atabaki, Amir H., et al., "Accurate post-fabrication trimming of ultra-compact resonators on silicon", Optics Express, Jun. 17, 2013, vol. 21, No. 12, pp. 14139-14145.

* cited by examiner

REMOVABLE OPTICAL TAP FOR IN-PROCESS CHARACTERIZATION

GOVERNMENT LICENSE RIGHTS

This invention was made with U.S. Government support under Agreement No. HR0011-08-9-0001 awarded by DARPA. The U.S. Government has certain rights in the invention.

BACKGROUND

Field

The present disclosure generally relates to techniques for characterizing optical components. More specifically, the present disclosure relates to an integrated circuit that includes a removable tap that can be used to characterize an optical device during fabrication of the integrated circuit.

Related Art

Silicon photonics is a promising technology that can provide large communication bandwidth, low latency and low power consumption for inter-chip and intra-chip optical interconnects or links.

However, many semiconductor devices are extremely sensitive to fabrication variations. For example, a variation of only a few nanometers in the width of an optical waveguide can result in a hundreds of gigaHertz change in a resonance wavelength of an interferometric or a resonant optical device whose spectral behavior is critical to its function.

In principle, if an optical characteristic of an optical device (such as its resonance wavelength) can be measured or tested when the optical device is being fabricated, then the optical device can be corrected (e.g., by trimming the optical device). However, in practice it is often difficult to measure the optical characteristic during fabrication without modifying or adversely impacting the subsequent performance of the optical device.

For example, one approach to performing such measurements is to add a vertical grating coupler to an integrated circuit that includes the optical device, so that an optical signal in the optical device can be tapped. However, creating and subsequently removing the vertical grating coupler often requires a series of potentially harmful and time-consuming fabrication operations. In addition, these fabrication operations often include the use of materials (such as implanting a chemical species) that are not standard in CMOS processes, as well as a subsequent anneal operation that typically restricts its placement in the overall process flow. Consequently, adding the vertical grating coupler can adversely impact the yield and, thus, can increase the cost of the integrated circuit.

Hence, what is needed is an integrated circuit with a removable optical tap that does not suffer from the above-described problems.

SUMMARY

One embodiment of the present disclosure provides a photonic chip (such as an integrated circuit) that includes: a substrate; a buried-oxide layer disposed on the substrate; and a semiconductor layer, disposed on the buried-oxide layer, that includes an optical waveguide that conveys an optical signal having a carrier wavelength. Moreover, the photonic chip includes an optical tap proximate and adjacent to the optical waveguide.

Furthermore, the photonic chip may include a decoupling material disposed over one of the optical waveguide and the optical in a region where the optical tap is proximate to the optical waveguide. For example, the decoupling material may include: polysilicon, amorphous silicon, and/or a polymer.

Note that the optical tap may include: polycrystalline silicon, amorphous silicon and/or a polymer.

In some embodiments, a width of the optical waveguide is decreased in a region where the optical tap is proximate to the optical waveguide.

Moreover, the optical tap may be included in the semiconductor layer.

Furthermore, the photonic chip may include one or more ring-resonator filters disposed between the optical waveguide and the optical tap.

Additionally, the carrier wavelength may match a target wavelength with a predefined accuracy without one of: thermal tuning, and electronic tuning. For example, the predefined accuracy may be 0.1 nm. Note that the optical waveguide may be trimmed so that the carrier wavelength matches the target wavelength within the predefined accuracy by oxidizing the semiconductor layer proximate to the optical waveguides, where the amount of oxidation may be specific to a given optical waveguide. This trimming may modify an effective index of refraction of the optical waveguide. Additionally, the optical waveguide may be trimmed without using a polymer to achieve the trimmed carrier wavelength (i.e., the carrier wavelength may be stable over time).

In some embodiments, the substrate includes a cavity, defined by an edge, through the substrate and the buried-oxide layer. Note that the trimming may occur via the cavity.

Moreover, the photonic chip may include a grating coupler optically coupled to the optical tap.

Furthermore, the photonic chip may include a cladding layer disposed on the semiconductor layer, where the cladding layer has a transmission coefficient exceeding a predefined value for at least a wavelength in an ultraviolet band of wavelengths.

Note that the substrate, the buried-oxide layer and the semiconductor layer may constitute a silicon-on-insulator technology.

Another embodiment provides a system that includes: a processor; memory, coupled to the processor, that stores a program module; and the photonic chip.

Another embodiment provides a method for trimming a carrier wavelength of an optical waveguide. During the method, an optical tap is defined proximate and adjacent to the optical waveguide in a photonic chip, where the optical waveguide is disposed on a buried-oxide layer on a silicon-on-insulator substrate, and where the optical tap is optically coupled to the optical waveguide. Then, using the optical tap, the carrier wavelength of an optical signal conveyed in the optical waveguide is measured. Moreover, the optical waveguide is trimmed based on a difference between the measured carrier wavelength and a target wavelength so that the carrier wavelength matches the target wavelength within a predefined accuracy by oxidizing the semiconductor layer proximate to the optical waveguide, where the amount of oxidation is specific to the optical waveguide. Next, the optical coupling between the optical tap and the optical waveguide is decreased, so that the optical coupling is less than a predefined value (such as 5, 10, 20, or 50% of the original coupling).

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an integrated circuit (which is sometimes referred to as a 'photonic chip'), a system that includes the integrated circuit, and a method for trimming carrier wavelengths of optical waveguides in the integrated circuit are described. This integrated circuit includes optical waveguides defined in a semiconductor layer. These optical waveguides provide one or more optical signals having carrier wavelengths that match target wavelengths with a predefined accuracy without: thermal tuning, and/or electronic tuning. In particular, the optical waveguides may be trimmed during fabrication of the integrated circuit so that the carrier wavelengths match the target wavelengths within the predefined accuracy by oxidizing the semiconductor layer proximate to the optical waveguides, and the amount of oxidation may be specific to a given optical waveguide. Note that the trimming may modify indexes of refraction of the optical waveguides. Moreover, the trimming may exclude or may not involve the use of a polymer and/or the carrier wavelengths at a given temperature may be stable as a function of time.

By facilitating accurate and permanent trimming of the optical waveguides (and, more generally, optical components or devices) in the integrated circuit, this characterization and fabrication technique may increase the accuracy of the optical signals and the yield of the integrated circuit. Therefore, the characterization and fabrication technique may improve the performance and reduce the cost of the integrated circuit. Furthermore, the characterization and fabrication technique may be used during wafer-scale fabrication of instances of the integrated circuit. Consequently, this characterization and fabrication technique may facilitate silicon photonic links for use in applications such as wavelength-division multiplexing.

Figure 1:
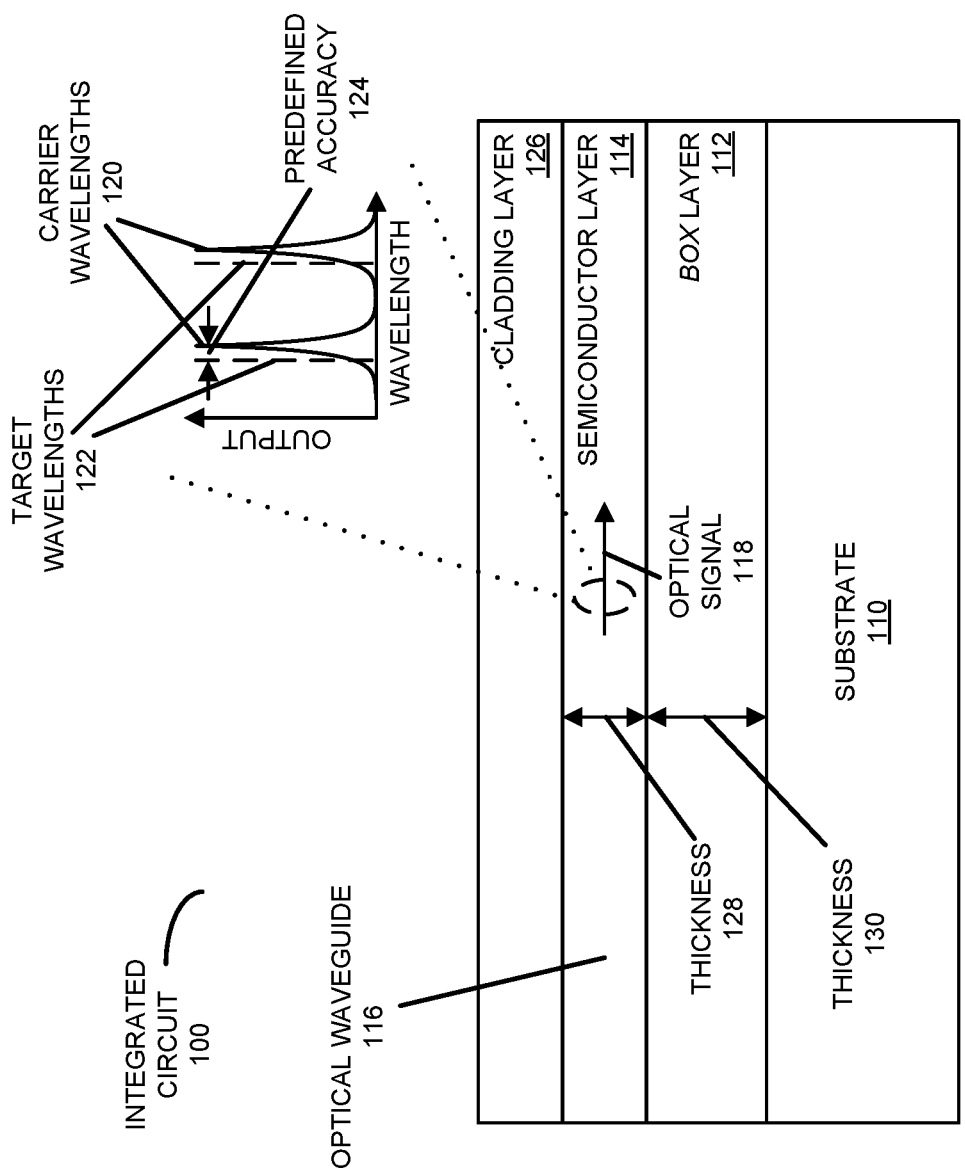
FIG. 1 is a block diagram illustrating a side view of an integrated circuit in accordance with an embodiment of the present disclosure.

We now describe embodiments of the integrated circuit. FIG. 1 presents a block diagram illustrating a side view of an integrated circuit 100. This integrated circuit includes: a substrate 110, a buried-oxide (BOX) layer 112 disposed on substrate 110 (e.g., buried-oxide layer 112 may be fabricated using a smartcut process), and a semiconductor layer 114 disposed on buried-oxide layer 112 (e.g., semiconductor layer 114 may be bonded to buried-oxide layer 112), where one or more optical waveguides (such as optical waveguide 116) are, at least in part, defined in semiconductor layer 114, and the one or more optical waveguides convey optical signals, i.e., light (such as optical signal 118). These optical signals may be highly confined because of the big difference between the index of refraction of semiconductor layer 114 and the surrounding material (such as a lower and an upper cladding).

Note that the optical signals have carrier wavelengths 120, and carrier wavelengths 120 match target wavelengths 122 with (or within) a predefined accuracy 124 without active tuning, such as: thermal tuning, and/or electronic tuning (such as carrier injection, carrier depletion and/or carrier accumulation). For example, predefined accuracy 124 may be 0.1 nm, which is used for illustrative purposes only. In other embodiments, a different value of predefined accuracy 124 is used. Moreover, at a given temperature, note that carrier wavelengths 120 may have a time stability that is permanent or infinite.

As described further below with reference to FIGS. 4-8, the one or more optical waveguides may be trimmed during fabrication so that carrier wavelengths 120 match target wavelengths 122 within predefined accuracy 124 by low-temperature oxidizing semiconductor layer 114 proximate to the one or more optical waveguides (e.g., using a laser), and the amount of oxidation may be specific to a given optical waveguide. For example, integrated circuit 100 may include a cladding layer 126 disposed on semiconductor layer 114, where cladding layer 126 has a transmission coefficient exceeding a predefined value (such as 0.9) for at least a wavelength in an ultraviolet band of wavelengths, thereby allowing ultraviolet laser light to be used to trim the given optical waveguide.

Note that the trimming may modify effective indexes of refraction of the one or more optical waveguides for a guided mode. Moreover, the trimming may exclude or may not involve the use of a polymer and/or carrier wavelengths 124 at a given temperature may be stable as a function of time. In some embodiments, the one or more optical waveguides are trimmed by depositing or removing material from integrated circuit 100.

Figure 2:
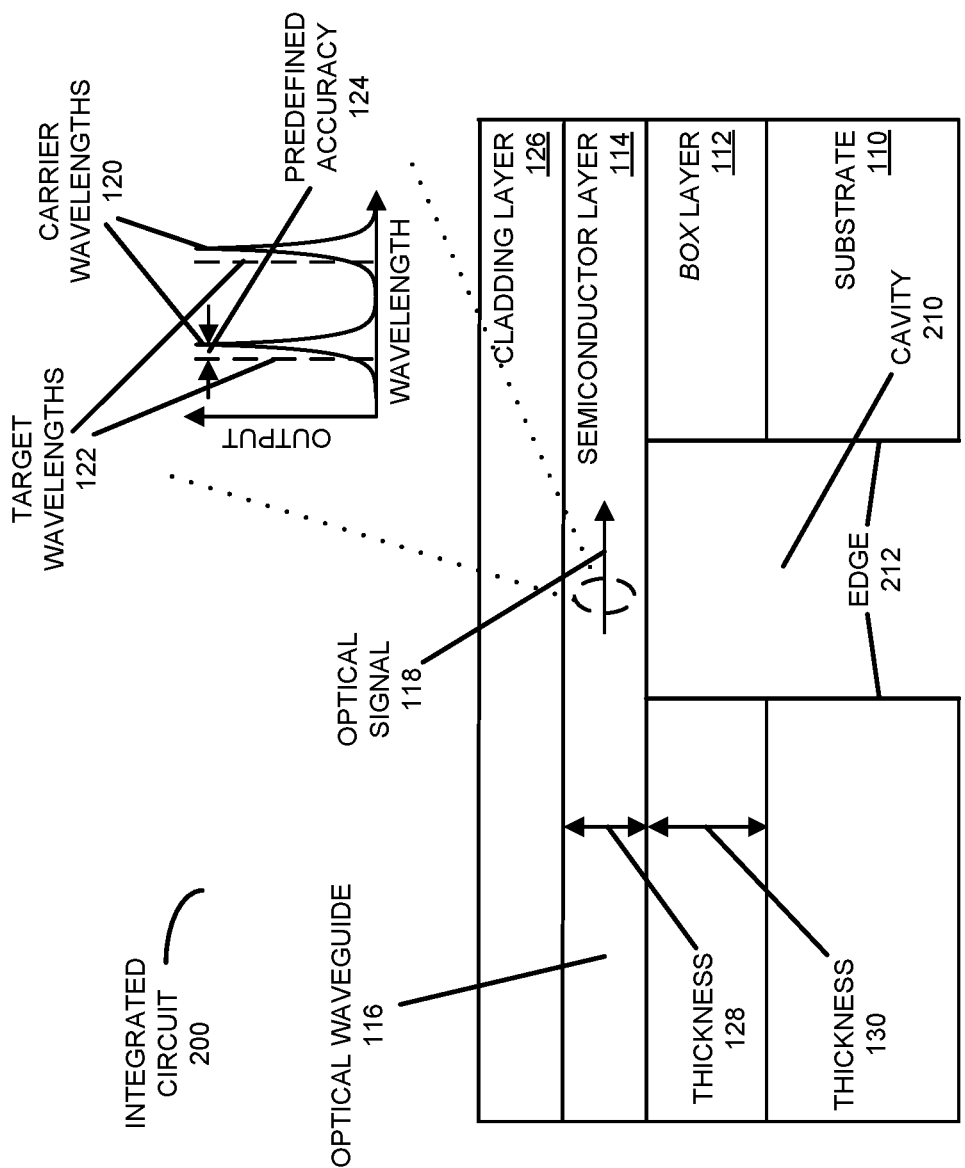
FIG. 2 is a block diagram illustrating a side view of an integrated circuit in accordance with an embodiment of the present disclosure.

Alternatively, as shown in FIG. 2, which presents a block diagram illustrating a side view of an integrated circuit 200, substrate 110 may include a cavity 210, defined by an edge 212, through substrate 110 and buried-oxide layer 112. The one or more optical waveguides may be trimmed via cavity 210, and the amount of oxidation may be specific to the given optical waveguide. Consequently, in some embodiments cavity 210 is defined and the trimming is performed after fabrication of integrated circuit 200 has been completed.

In addition to features that facilitate trimming, the integrated circuit may include one or more features that facilitate measurement of carrier wavelengths 120 (FIG. 1) during fabrication of the integrated circuit, so that the amount of trimming can be determined. In order to prevent an adverse impact on the performance of the integrated circuit, these metrology features may be subsequently removed and/or disabled. For example, the metrology features may include removable taps, so that there is no loss of real estate in the integrated circuit.

Figure 3:
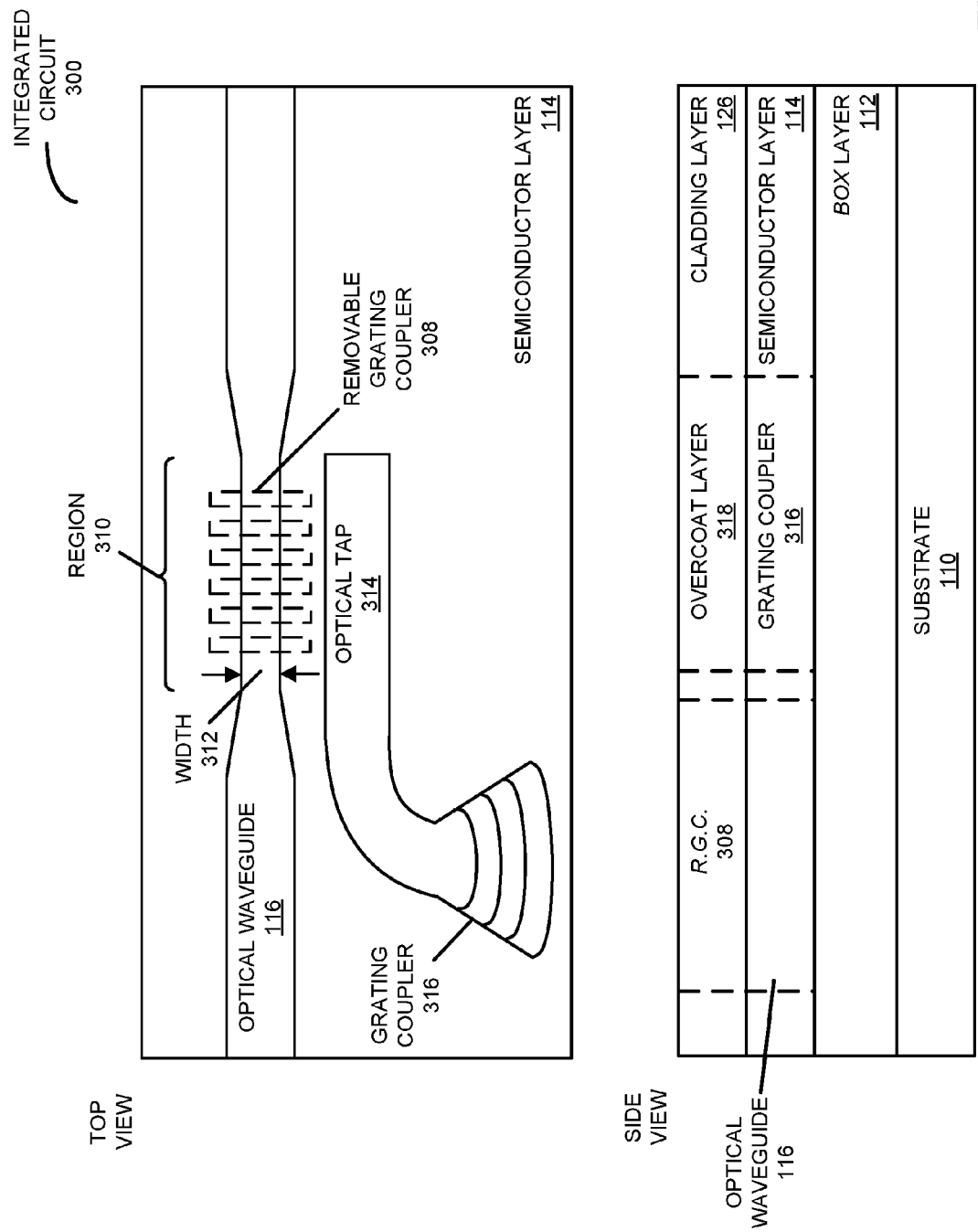
FIG. 3 is a block diagram illustrating a top view and a side view of an integrated circuit in accordance with an embodiment of the present disclosure.

This is shown in FIG. 3, which presents block diagrams illustrating a top view and a side view of an integrated circuit 300. In particular, the one or more optical waveguides may include regions (such as region 310) in which a width (such as width 312) of the optical waveguides is reduced by more than a threshold value. For example, the width may be reduced by 50% (e.g., from 0.5 to 0.25 µm) in region 310, which may facilitate optical coupling of optical signal 118 (FIGS. 1 and 2) out of optical waveguide 116, e.g., to a removable (or erasable) grating coupler (R.G.C.) 308 that was temporarily disposed above optical waveguide 116 (and, thus, which functioned as a removable optical tap to measure one or more carrier wavelengths during fabrication of integrated circuit 300).

Alternatively or additionally, instead of being temporarily disposed above the one or more optical waveguides, such metrology features may be adjacent to the one or more optical waveguides. This is shown in the top view of integrated circuit 300. In particular, integrated circuit 300 may include: optical taps (such as optical tap 314) optically coupled to the one or more optical waveguides; grating couplers (such as grating coupler 316) optically coupled to the optical taps; and an overcoat layer 318 (such as polysilicon and/or amorphous silicon) disposed on semiconductor layer 114 over the optical taps, wherein an optical coupling between the one or more optical waveguides and the optical taps is less than a second threshold value. As described further below with reference to FIG. 9, during fabrication of integrated circuit 300 the optical coupling may be strong enough to facilitate measurement of one or more of the optical signals. However, by the end of the fabrication, when overcoat layer 318 is disposed on semiconductor layer 114, the optical coupling may be reduced sufficiently that normal operation of integrated circuit 300 is not affected by the optical taps.

Note that removable grating coupler 308 and/or grating coupler 316 may have a period between 300 and 500 nm.

While a wide variety of materials can be used in semiconductor layer 114 in integrated circuits 100 (FIG. 1), 200 (FIG. 2) and 300, in an exemplary embodiment silicon is used. Furthermore, while a wide variety of materials may be used in substrate 110 (such as a semiconductor, glass or plastic), in an exemplary embodiment silicon is used in substrate 110, along with silicon dioxide in buried-oxide layer 112. Consequently, in some embodiments, substrate 110, buried-oxide layer 112 and semiconductor layer 114 may comprise a silicon-on-insulator (SOI) technology. However, in other embodiments the characterization and fabrication technique is applied to III-V semiconductors.

In an exemplary embodiment, optical waveguide 116 conveys optical signal 118 having wavelengths between 1.1-1.7 µm, such as an optical signal having a fundamental wavelength of 1.3 or 1.55 µm. This optical waveguide may have a thickness 128 between 0.25 and 3 µm, and width 312 between 0.5 and 3 µm. Note that because optical waveguide 116 may have a quasi-rectangular cross-section, it may be a quasi-single mode component. Moreover, buried-oxide layer 112 may have a thickness 130 between 0.3 and 3 µm.

We now further describe embodiments of the characterization and fabrication technique. In the characterization and fabrication technique, removable grating couplers may be formed on top of partially processed optical waveguides during fabrication or in-process, such that an optical signal can be tapped into or out of an optical waveguide for optical characterization, photonic circuit validation, and/or trimming. The grating couplers may be easily added (e.g., lithographically) and, in some embodiments, easily removed (e.g., using stripping), without being invasive to the actual fabrication processes or the performance of the resulting integrated circuit. Note that this approach may be the most targeted and the least invasive for optical waveguides with effective indexes of refraction that are similar to the strippable photoresists or polymers used to form the grating couplers.

In general, the correction or trimming can be performed by measuring the optical devices and actively trimming them or by measuring them and binning them for some future process or packaging decision (which could improve yield).

By having a non-invasive approach for probing or measuring the optical characteristics of such a fabricated optical waveguide within the process flow, failed process operations or out-of-spec wafers can be identified and possibly corrected before costly processing and packaging operations have been completed. For example, the characterization and fabrication technique may address a limitation of ring-resonator-based photonics technology. In particular, while ring resonators are energy efficient, it is often difficult to fabricate ring resonators so that they have the target resonance wavelengths across the wafer or from wafer to wafer because of their extreme sensitivity to fabrication variation. The ability to add a characterization in-process and correct for the fabrication variation may significantly increase the viability of this technology. Consequently, the characterization and fabrication technique can significantly improve the yield and, thus, a value proposition of a photonic product.

In contrast with existing approaches, the characterization and fabrication technique may: involve fewer operations; may not impact the performance of optical devices; and may not require local annealing or high temperature processes and, therefore, can easily be added at multiple places in most processes flows. For example, implantation in the existing approaches at the level required to induce index of refraction changes may change properties of the optical device, particularly if the device is already doped. Furthermore, many facilities do not have implantation on-site or do not implant species that anneal out of a semiconductor. Finally, for some extremely sensitive applications (such as micro-ring resonators), implantation may be used for trimming micro-rings to the appropriate resonance wavelength. However, in this case, a removable grating coupler (which requires an anneal operation to remove the grating or the trimming) cannot be used, because it will not be maintained post anneal.

Figure 4:
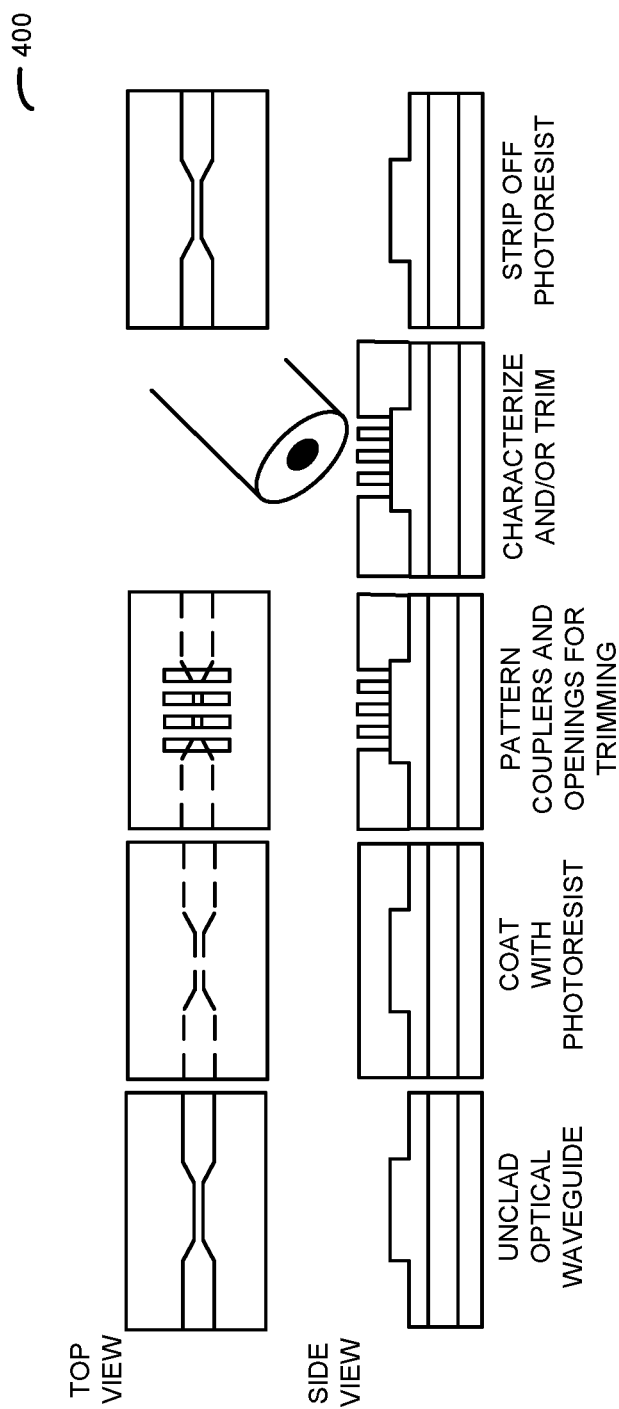
FIG. 4 is a drawing illustrating a method for in-process non-invasive optical characterization of an integrated circuit in accordance with an embodiment of the present disclosure.

Note that photoresist is part of nearly every semiconductor process and has an index of refraction near 1.5. Therefore, photoresist can be used to coat an unclad silicon optical waveguide, which is then patterned into grating couplers. In this way the grating perturbation and the cladding are formed by the photoresist (or similar patternable polymers, such as electron-beam resist, etc.). Following formation of the photoresist grating coupler, optical characterization, trimming, and wafer sorting can be conducted, and the resist can be stripped completely off before additional processing is completed. FIG. 4 presents a drawing illustrating a method 400 for in-process non-invasive optical characterization of an integrated circuit. In this example, the optical waveguide is narrowed to increase the optical coupling efficiency to an optical fiber. However, in other embodiments, the narrowing is not necessary for the concept to work, especially if the photopatternable polymer has a higher index of refraction or if an easily removal polymer, dielectric, or semiconductor is used. For example, silicon nitride can be lifted off or removed with hydrogen fluoride without etching the silicon. Consequently, in some embodiments this is used as a tuning or trimming mechanism.

Figure 5:
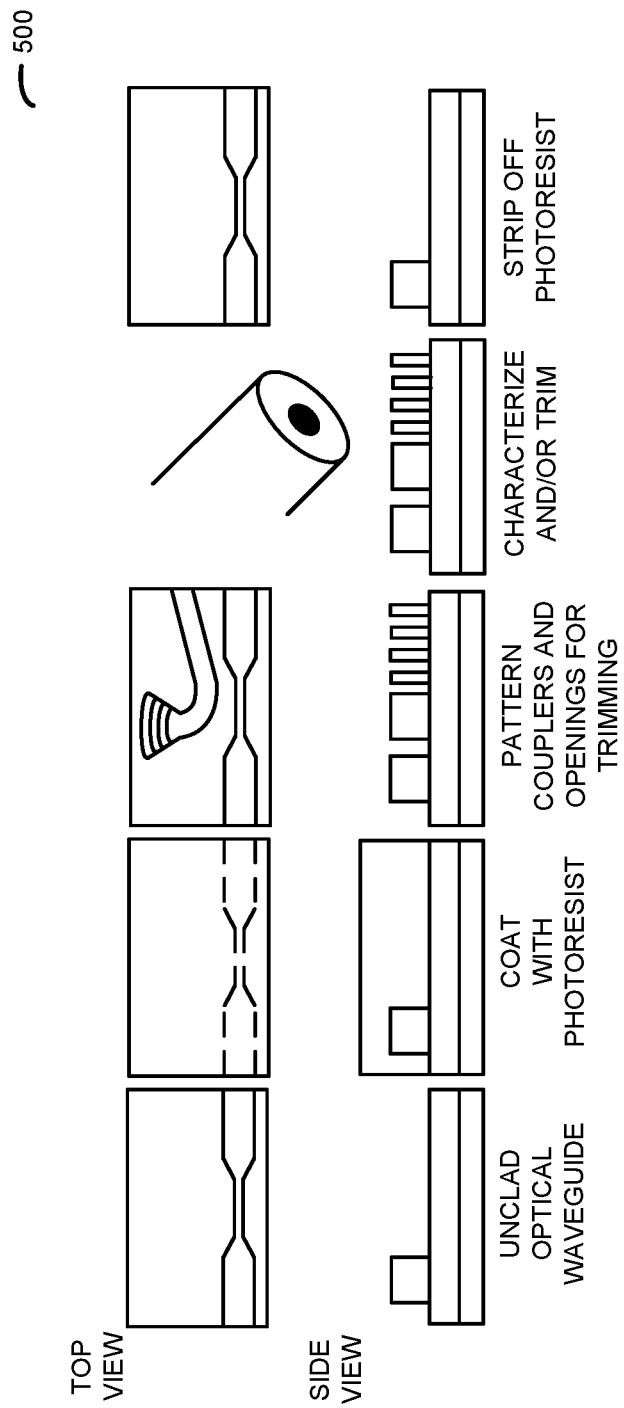
FIG. 5 is a drawing illustrating a method for in-process non-invasive optical characterization of an integrated circuit in accordance with an embodiment of the present disclosure.
Figure 6:
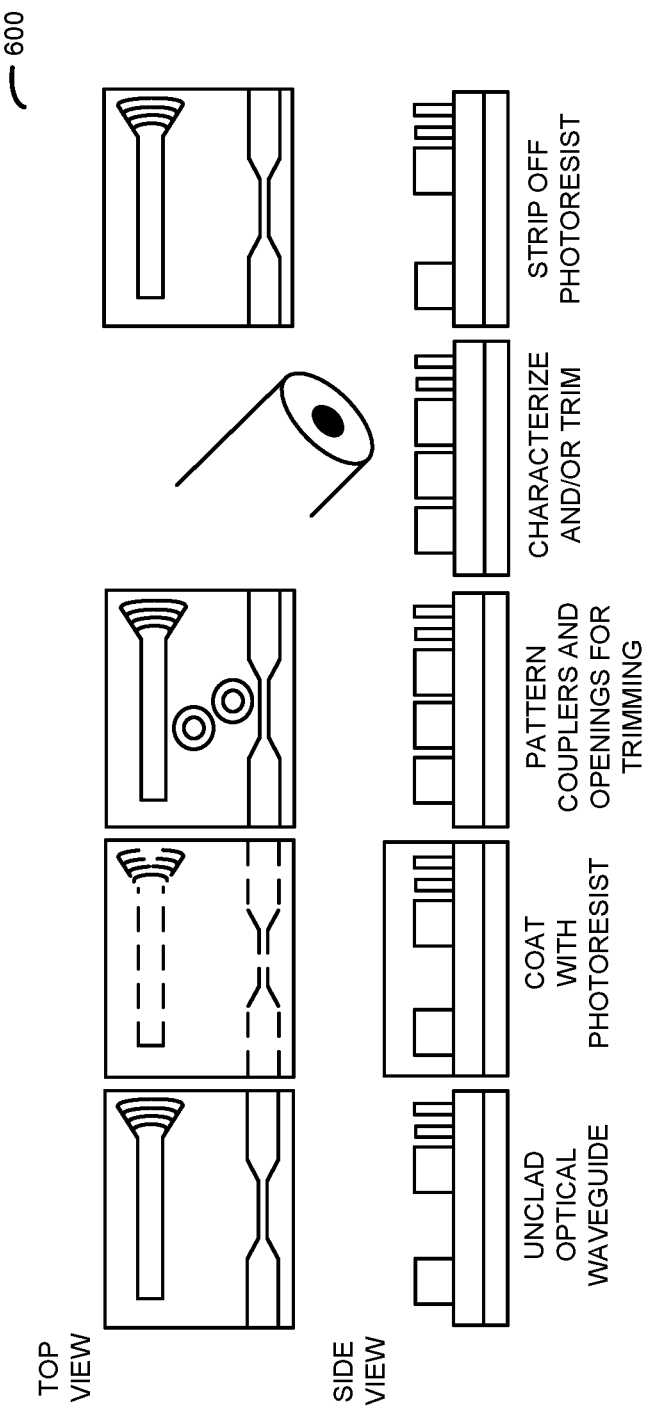
FIG. 6 is a drawing illustrating a method for in-process non-invasive optical characterization of an integrated circuit in accordance with an embodiment of the present disclosure.
Figure 7:
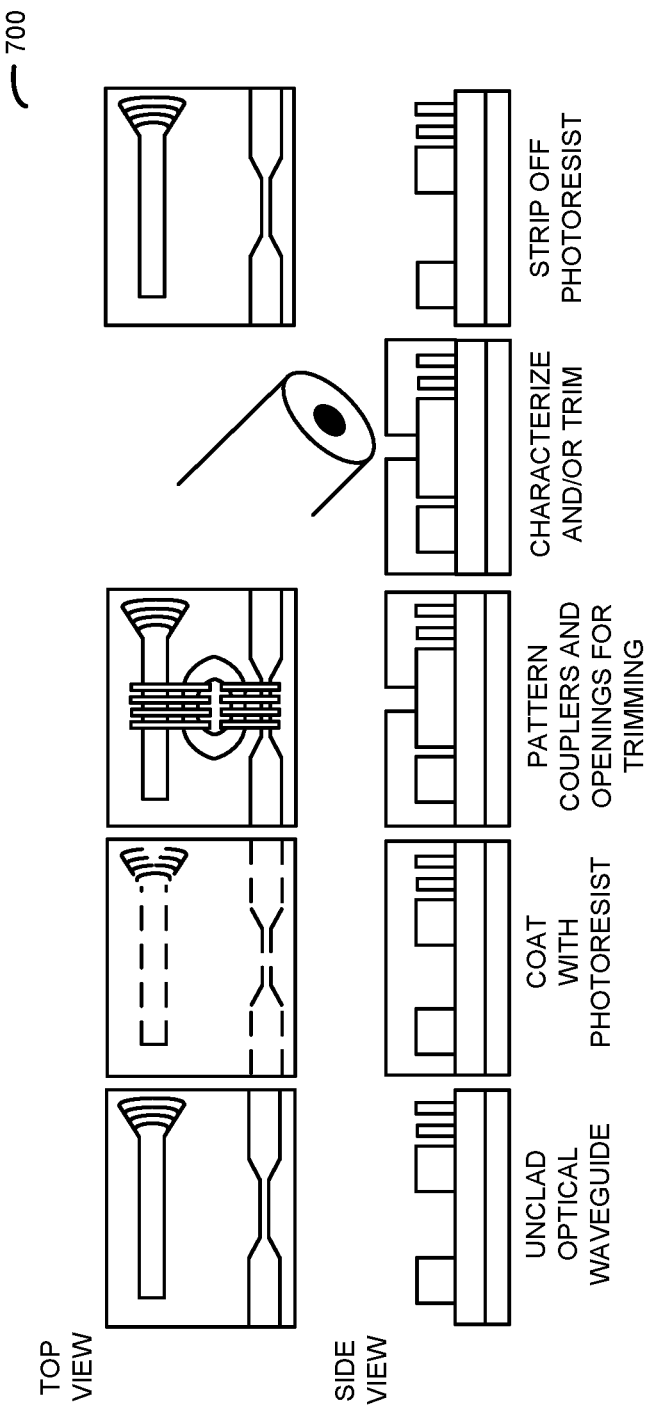
FIG. 7 is a drawing illustrating a method for in-process non-invasive optical characterization of an integrated circuit in accordance with an embodiment of the present disclosure.

Alternatively, a variety of other techniques and temporary or permanent features may be used to perform the characterization during fabrication of the integrated circuit, including: an optical tap, one or more ring resonators and patterned grating-assisted optical couplers. These other techniques are, respectively, shown in FIGS. 5-7, which present drawings illustrating methods 500, 600 and 700 for in-process non-invasive optical characterization of an integrated circuit. In particular, FIG. 5 presents an example where the optical waveguide and/or grating coupler are made from photoresist. Moreover, FIG. 6 presents an example where a symmetric broadband ring-resonator coupler is formed from photoresist and is coupled to a silicon grating coupler so as to achieve more efficient coupling (which allows a portion of an optical signal to be tapped off from the optical waveguide). Furthermore, FIG. 7 presents an example where a grating-assisted directional coupler-based ring coupler is formed from photoresist and coupled to a silicon grating coupler, thereby achieving more-efficient optical coupling for probing with an optical fiber.

Figure 8:
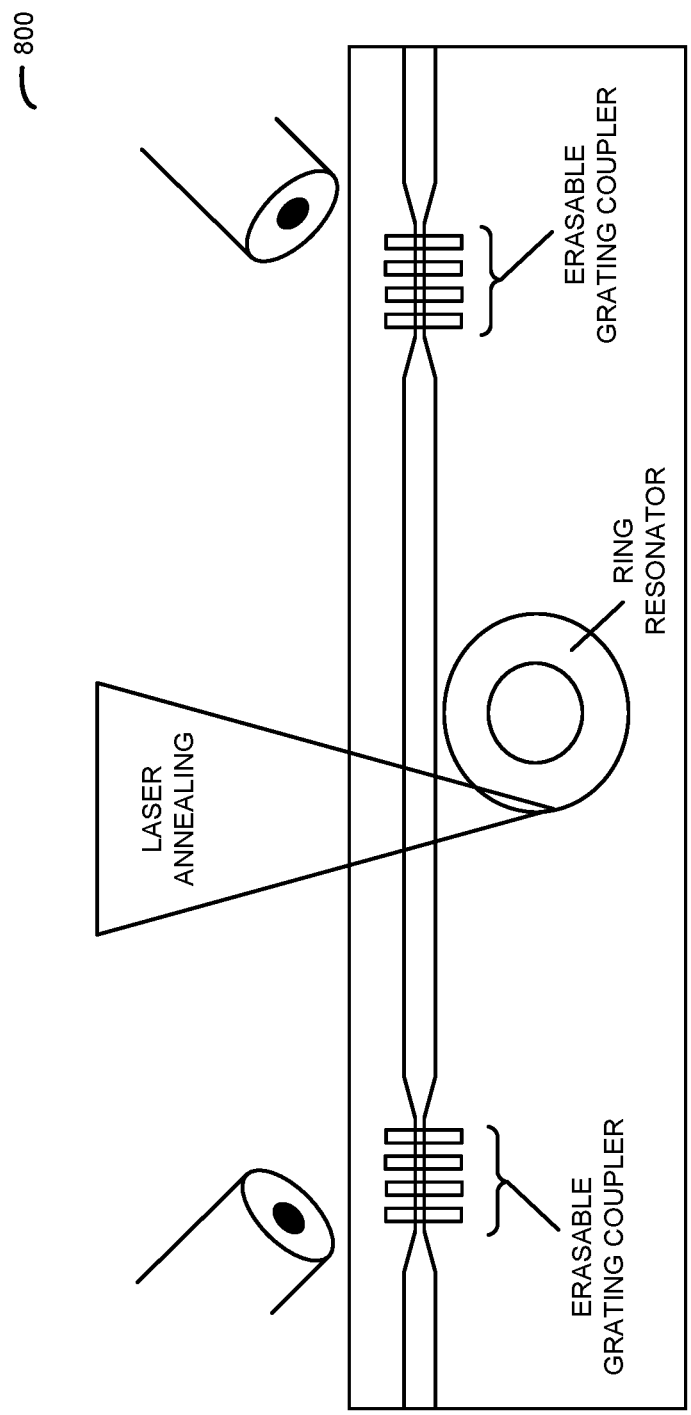
FIG. 8 is a drawing illustrating trimming of a ring resonator in an integrated circuit in accordance with an embodiment of the present disclosure.

Trimming of a ring resonator in an integrated circuit using laser-assisted annealing with characterization via an erasable grating coupler is shown in FIG. 8. Note that using the erasable grating couplers before and after the ring resonator, characterization and trimming can be performed concurrently. By trimming using a laser anneal, generalized annealing of the integrated circuit can be avoided, so the overall performance is unaffected. Similarly, because the optical tap (the erasable grating coupler) is removable, there may not be an adverse impact on the performance of the integrated circuit after fabrication.

In some embodiments, the temporary addition of the polymer used to fabricate the metrology features occurs after the dielectrics have been deposited. For example, if the polymer is applied following a back-end substrate removal, the ring resonator would already be subjected to the stresses of the large stack of dielectrics in a full CMOS flow and, therefore, may preserve their state following any trimming.

Figure 9:
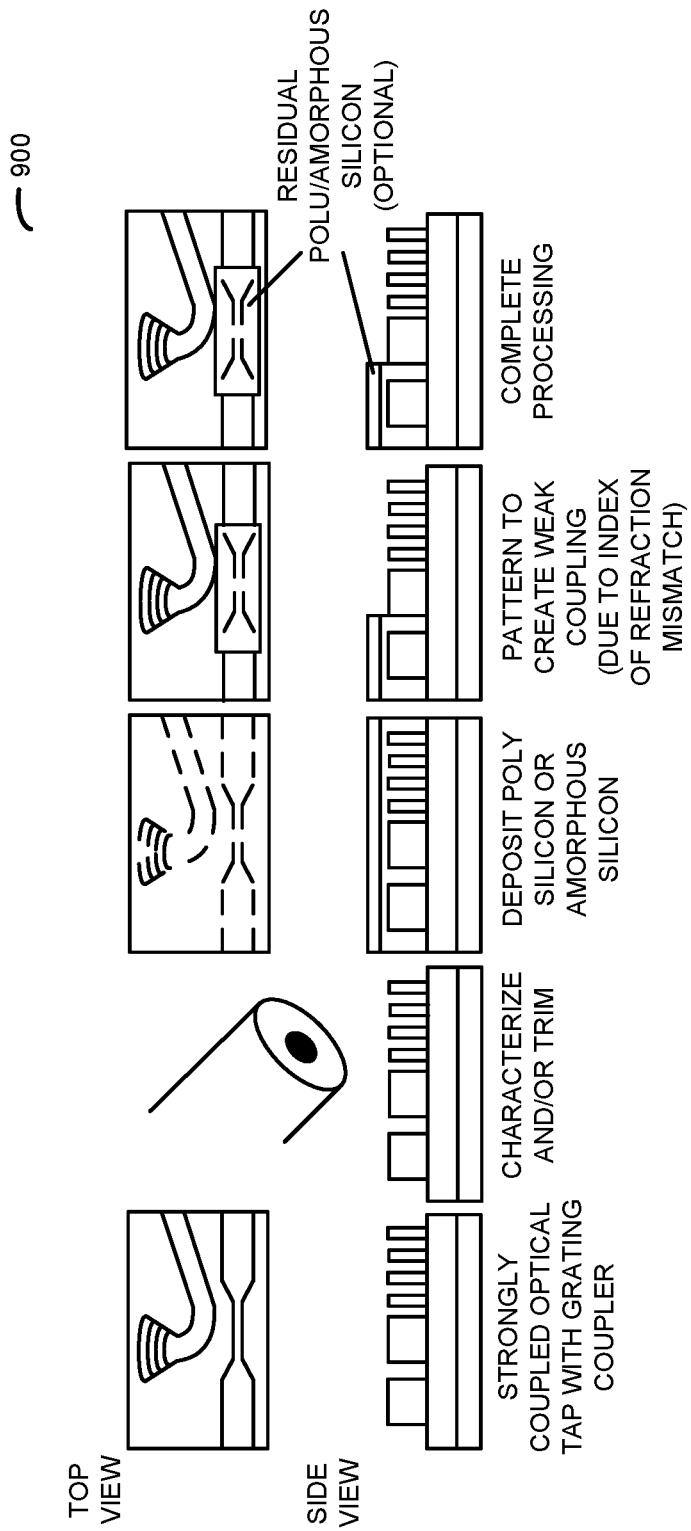
FIG. 9 is a drawing illustrating a method for in-process trimming of an optical device in an integrated circuit in accordance with an embodiment of the present disclosure.

While the metrology features may be temporary or removable, in other embodiments at least portions of the metrology features may remain in the integrated circuit. However, the optical coupling to the metrology features may be decreased, so that the metrology features do not adversely impact the performance of the integrated circuit. One approach for achieving this is shown in FIG. 9, which presents a drawing illustrating a method 900 for in-process trimming of an optical device in an integrated circuit.

We now describe the trimming in more detail. In principle, the requirements for the single-shot trimming in post-fabrication treatment of CMOS photonic integrated circuits include: long-term stability, fast trimming, and sufficient trimming range. In particular, ideally, the single-shot trimming should permanently change a resonance wavelength of a ring resonator (and, thus, the resulting carrier wavelength in an optical waveguide) to a target wavelength for a given ring resonator at a given temperature. This may preclude the use of polymer materials to implement the trimming, because polymers often exhibit relaxation, moisture absorption, photo-aging and other negative properties that typically make these materials unsuitable for use in CMOS processing. Moreover, because the number of ring-resonator modulators per die in most wavelength-division-multiplexing (WDM) applications can be between 100 and 10,000, and because wafers typically include around 1000 dies (depending on the wafer diameter and die size), sub-second trimming times are usually necessary to make the wafer-level trimming feasible. Furthermore, because small ring and disc resonators have large (greater than 20 nm) free-spectral ranges, the trimming range typically must be large enough to accommodate at least one free-spectral range for a given resonant silicon-photonic optical component.

For trimming of CMOS photonic silicon ring-resonator devices, the described trimming may be: permanent, ultra-fast (less than one second trimming time per device), and capable of achieving a trimming range in excess of 30 nm. This trimming may be implemented after the front-end-of-the-line (FEOL) CMOS process and/or after the back-end-of-the-line (BEOL) CMOS process.

Silicon WDM ring devices (such as ring-resonator modulators on the transmitter side and/or drop filters on the receiver side) may be fabricated using a Freescale HIP07 CMOS-compatible silicon photonic fabrication process. However, inevitable variations in the optical waveguide geometry may induce shifts in the designed or target resonant wavelengths and mismatches between the transmitter and the receiver wavelengths. In order to maintain a low-power budget, the trimming may involve 'single-shot' post-fabrication trimming based on localized low-temperature oxidation of silicon, which can be induced by deep-ultraviolet (DUV) excited dimer (excimer) laser irradiation in an oxygen atmosphere. In the FEOL embodiment, a top-side trimming operation may be performed after the last high-temperature operation in the fabrication process. Alternatively or additionally, in the BEOL embodiment, the silicon film may be oxidized from: the substrate side of the ring-resonator device (i.e., the 'bottom' of the optical waveguide) and/or the top, through a transparent cladding, which includes an oxygen-supplying layer (i.e. an 'oxygen fuse') or implanted oxygen. In both embodiments, the trimming preserves the integrity of the CMOS stack. Moreover, in both embodiments oxidation of silicon layers may effectively reduce the rib and, in the BEOL embodiment, the slab height of the silicon optical waveguide, thereby trimming the effective index of refraction to the desired value. (The 'effective index of refraction' of an optical waveguide is the weighted sum of the material indexes of refraction of the core(s) and cladding(s) (i.e., all the layers that the optical waveguide is comprised of), where the weighting coefficients are the respective confinement factors. Moreover, the confinement factors indicate how much optical power is confined to certain layers. In other words, if the core material has an index of refraction of 3, the cladding has an index of refraction of 1, and 80% of light in the optical waveguide is confined to the core and 20% of light is confined to the cladding, then the effective index of refraction is 0.8·3+0.2·1=2.4+0.2=2.6.) Note that the trimming range in the trimming technique may satisfy the requirements of a typical micro-ring device (which may have approximately a 12 nm free-spectral range) and a typical micro-disc device (which may have approximately a 25 nm free-spectral range) used in WDM links. However, there is no upper or lower bound on the free-spectral range in the trimming technique, i.e., it can be applied to a wide variety of ring devices and, more generally, optical components. Thus, the free-spectral range may be between 0.1 and 50 nm.

In order to support single-shot trimming, the trimming technique may use a photolithography step-and-repeat (stepper) approach, in which a light source (such as a laser source) illuminates a photolithography mask, and the modulated light passes through a reduction lens prior to illuminating the exposed wafer. Moreover, the trimming technique may use an 'active mask' principle, in which the photolithography mask is a reverse-tone and expanded copy of the optical waveguide layer mask. Furthermore, the actual reticle plate may include a time-control element (such as a micro-shutter, a MEMS mirror and/or a liquid-crystal modulator) that provides device-level exposure timing control. The desired trimming dosage may be applied to individual ring resonators by time control of the exposure, which may be implemented by the time-control element. (Thus, the active time-control element may provide a ring-dependent cutoff.) In this way, the ring resonators on a die may be exposed at the same time and may receive the appropriate trimming dosage. (Note that, prior to trimming, one or more resonance-wavelength measurements may be performed on some or all of the devices across a die or a wafer to determine the necessary change to the resonance wavelengths of different ring resonators across a die, different dies and/or the wafer.)

In the trimming technique, a deep ultra-violet (DUV) excited dimer (excimer) laser source may be used (such as a 248 nm krypton-fluoride laser source or a similar 193 nm argon-fluoride laser source), which may be capable of delivering optical power fluxes in excess of 200 mJ/cm$^2$ (either continuous wave or using a pulse or repetition rate of several kilohertz). Moreover, the numeric aperture of the stepper may be 0.57. Furthermore, the lens reduction ratio (N:1) may range from 3.3:1 to 5:1.

In an exemplary embodiment, a ring-resonator modulator uses a Luxtera/Freescale optical waveguide geometry (with a thickness of the silicon semiconductor layer of 300 nm, a 220 nm deep etch, and a 380 nm wide optical waveguide). The achievable trimming range for post-FEOL is calculated as a 4.615 nm resonance-wavelength shift for each nanometer of oxidation depth (the amount of silicon oxidized). Similarly, the achievable trimming range for post-BEOL is calculated as a −2.308 nm resonance-wavelength shift for each nanometer of oxidation depth (the amount of silicon oxidized).

Regarding the physical process of DUV-induced oxidation in an oxygen atmosphere, laser-induced oxidation of silicon has been studied by several researchers. This work demonstrated ultrafast oxidation of silicon in a dry oxygen atmosphere, using a xenon-monochloride excimer laser, with 5 ns pulses, having approximately 5 mJ energy at a wavelength of 308 nm. The oxidation rate was reported to be greater than 10 nm/s, with a near-ideal stoichiometry of the grown oxide. Additional research studied the wavelength dependence of the oxidation rate in both dry and wet atmospheres. This research showed that temperature increase, induced by absorption of the laser light in silicon, does not play the main role in the increased oxidation rate. Instead, it has been proposed that 3.5 eV photons, used in the experiment, induced the transition of electrons from the conduction band of silicon, to the conduction band of silicon dioxide (which has a barrier height of 3.2 eV), where the electrons charge dissolved oxygen to form $O_2^-$ reactant ions. Note that the principal oxidants in dry growth of silicon dioxide are $O^-$, $O_2^-$ and $O^-$, whereas $O_2$ species require an electron ($O_2^-$) to insert themselves into the silicon lattice. Thus, the trimming technique may use deep free-radical formation to achieve low-temperature oxidation.

In these ways, the trimming technique may provide a means for permanent, large-volume, parallel, ultra-fast, one-shot correction of fabrication inaccuracies and SOI-thickness variation-induced phase errors in silicon ring resonators and other silicon photonic devices (such as AWGs, Echelle gratings, MZIs, etc.). This trimming technique may not use polymer materials (or other new materials that are not available in standard CMOS processing), which carry significant risk of aging and performance degradation over time. Moreover, the trimming technique may not involve the selective removal of already fabricated layers on top of the ring resonator. Furthermore, the post-BEOL oxidation trimming embodiments may not affect the performance of ring resonators and other CMOS devices on die. This trimming technique may have a large spectral trimming range (approximately 30 nm), which may be sufficient for WDM links using ultra-compact ring or disc resonators.

In an exemplary embodiment, the trimming technique is used with silicon photonics. However, in other embodiments the trimming technique is used with indium phosphide or in a dielectric platform. Note that photoresist taps may be useful in a dielectric platform because the index of refraction of a photoresist is close to that of the dielectric cores.

Moreover, a tap may be or may include an element that optically couples the optical signal from the integrated circuit to a characterization element outside of the final device. These characterization elements may be used to characterize the integrated circuit during fabrication so that its function can be validated. If the function does not meet specified or target performance, the wafer can either be discarded or reworked. This can be an iterative process. Thus, the use of the taps may provide a way to extract the optical signal from the integrated circuit during characterization, and may not impact the integrated circuit after characterization.

The taps may be made with a core material that may be etched away after using the tap (e.g., is removed, but may not be a different a material from the core, such as the removable material below the core, i.e., photoresist). Alternatively or additionally, the tap may be overclad with a material that breaks the symmetry of the optical coupler of the tap after use of the tap, thereby making the tap a negligible perturbation to the integrated circuit. Note that the overclad material may be deposited in an asymmetric way and/or may be patterned in an asymmetric way.

Moreover, the tap may be made of a removable material that may perturb the light in the integrated circuit to couple light from the integrated circuit into an optical fiber or detecting element (e.g., the grating coupler may be made out of photoresist). Alternatively or additionally, the tap may couple the light from the integrated circuit efficiently, and then may couple the light to an optical fiber or detector (e.g., the photoresist may be the directional coupler and the grating coupler.)

Furthermore, the tap may uses both a removable material and a core material. For example, the removable material may be used to couple from the integrated circuit to an element made of the core material that couples to the detecting element. Alternatively or additionally, the removable material may not couple light unless a temporary assisting material is added, such as photoresist coupled rings, a grating-assisted directional coupler, or a removable material of higher index of refraction than the permanent cladding yet to be added (this removable material may increase the coupling to the tap during use of the tap).

Figure 10:
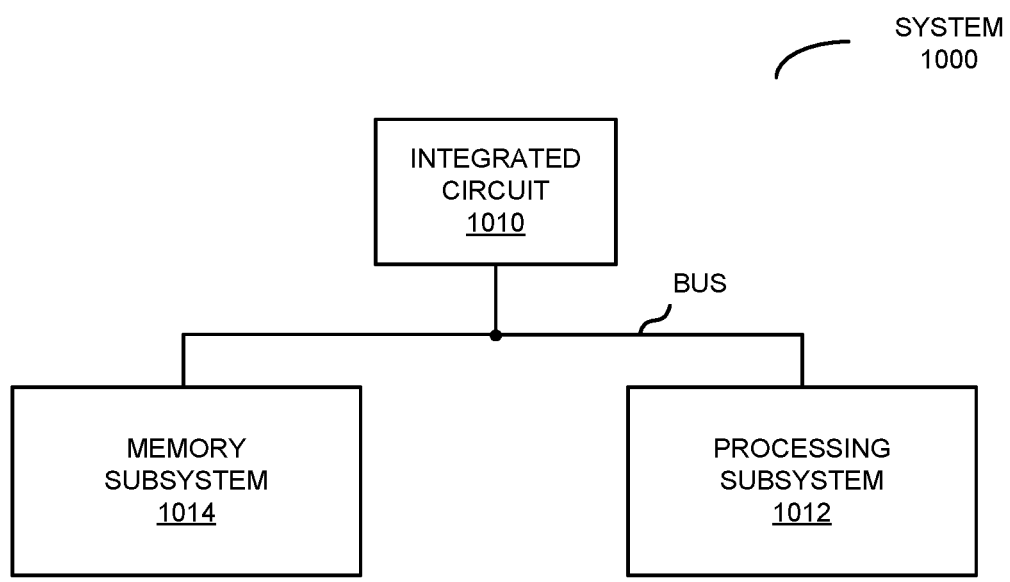
FIG. 10 is a block diagram illustrating a system that includes an integrated circuit in accordance with an embodiment of the present disclosure.

The integrated circuit with the trimmed optical devices may be used in a variety of applications. This is shown in FIG. 10, which presents a block diagram illustrating a system 1000 that includes an integrated circuit 1010, such as one of the preceding embodiments of the integrated circuit. In some embodiments, system 1000 includes processing subsystem 1012 (with one or more processors) and memory subsystem 1014 (with memory).

In general, functions of integrated circuit 1010 and system 1000 may be implemented in hardware and/or in software. Thus, system 1000 may include one or more program modules or sets of instructions stored in a memory subsystem 1014 (such as DRAM or another type of volatile or non-volatile computer-readable memory), which, during operation, may be executed by a processing subsystem 1012. Note that the one or more computer programs may constitute a computer-program mechanism. Furthermore, instructions in the various modules in memory subsystem 1014 may be implemented in: a high-level procedural language, an object-oriented programming language, and/or in an assembly or machine language. Note that the programming language may be compiled or interpreted, e.g., configurable or configured, to be executed by the processing subsystem.

Components in system 1000 may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 1000 may be at one location or may be distributed over multiple, geographically dispersed locations.

System 1000 may include: a VLSI circuit, a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device.

Moreover, integrated circuit 1010 can be used in a wide variety of applications, such as: communications (for example, in a transceiver, an optical interconnect or an optical link, such as for intra-chip or inter-chip communication), a radio-frequency filter, a bio-sensor, data storage (such as an optical-storage device or system), medicine (such as a diagnostic technique or surgery), a barcode scanner, metrology (such as precision measurements of distance), manufacturing (cutting or welding), a lithographic process, data storage (such as an optical-storage device or system) and/or entertainment (a laser light show).

Furthermore, the embodiments of integrated circuit 1010 and/or system 1000 may include fewer components or additional components. Although these embodiments are illustrated as having a number of discrete items, these optical components, integrated circuits and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the optical source, integrated circuit 1010 and/or system 1000 may be implemented more in hardware and less in software, or less in hardware and more in software, as is known in the art.

While the preceding embodiments have been illustrated with particular elements and compounds, a wide variety of materials and compositions (including stoichiometric and non-stoichiometric compositions) may be used, as is known to one of skill in the art. Thus, while a silicon optical waveguide was illustrated in the preceding embodiments, the characterization and fabrication technique may be used with other materials (such as germanium silicon germanium), as is known to one of skill in the art. Moreover, the semiconductor layer may include polysilicon or amorphous silicon. Furthermore, the materials and compounds in integrated circuit 1010 may be fabricated using a wide variety of processing techniques, including: evaporation, sputtering, chemical vapor deposition, molecular-beam epitaxy, wet or dry etching (such as photolithography or direct-write lithography), polishing, etc. In some embodiments, the fabrication involves transferring a partially completed wafer from one fab to another, so that additional fabrication techniques and/or materials, which may not be available in the initial fab, can be used. In addition, a wide variety of optical components may be used in or in conjunction with the integrated circuit 1010. Furthermore, a wide variety of optical sources may be integrated with or included in integrated circuit 1010, including many different types of lasers or non-laser optical sources (such as a light-emitting diode).

Figure 11:
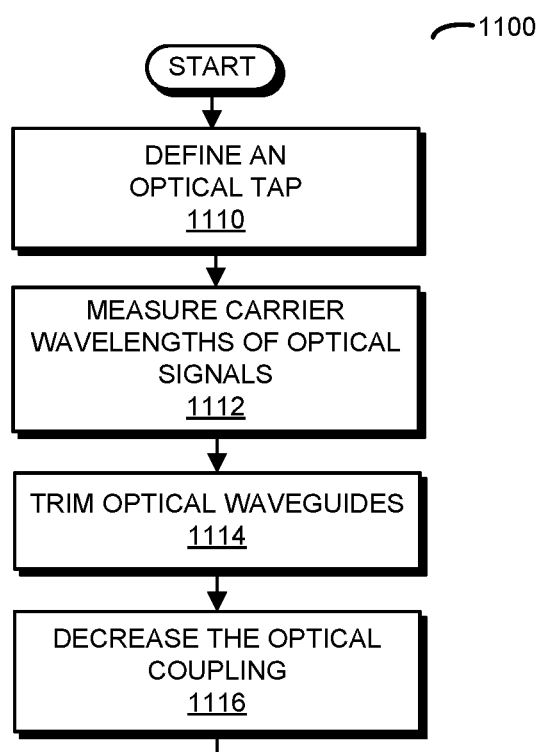
FIG. 11 is a flow diagram illustrating a method for trimming a carrier wavelength of an optical waveguide in an integrated circuit in accordance with an embodiment of the present disclosure.

We now describe embodiments of the method. FIG. 11 presents a flow chart illustrating a method 1100 for trimming a carrier wavelength of an optical waveguide in an integrated circuit, such as one of the preceding embodiments of the integrated circuit. During the method, an optical tap is defined (operation 1110) proximate and adjacent to the optical waveguide in a semiconductor layer disposed on a buried-oxide layer on a silicon-on-insulator substrate. Then, using the optical tap, the carrier wavelength of an optical signal conveyed in the optical waveguide is measured (operation 1112). Moreover, the optical waveguide is trimmed (operation 1114) based on a difference between the measured carrier wavelength and a target wavelength so that the carrier wavelength matches the target wavelength within a predefined accuracy by oxidizing the semiconductor layer proximate to the optical waveguide, where the amount of oxidation is specific to the optical waveguide. Next, the optical coupling between the optical tap and the optical waveguide is removed or decreased (operation 1116). For example, the optical coupling may be decreased by 50, 80, 90 or 95%.

In some embodiments of methods 400 (FIG. 4), 500 (FIG. 5), 600 (FIG. 6), 700 (FIG. 7), 800 (FIG. 8), 900 (FIG. 9) and/or 1100, there are additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A photonic chip, comprising:
   a substrate;
   a buried-oxide layer disposed on the substrate;
      a semiconductor layer, disposed on the buried-oxide layer, that includes an optical waveguide that is configured to convey an optical signal having a carrier wavelength, wherein the optical waveguide is trimmed so that the carrier wavelength matches a target wavelength within a predefined accuracy without using a polymer; and
      an optical tap proximate and adjacent to the optical waveguide.

2. The photonic chip of claim 1, wherein the photonic chip includes a decoupling material disposed over one of the optical waveguide and the optical in a region where the optical tap is proximate to the optical waveguide.

3. The photonic chip of claim 2, wherein the decoupling material includes one of: polysilicon, amorphous silicon, and a polymer.

4. The photonic chip of claim 1, wherein the optical tap includes one of: polycrystalline silicon, and amorphous silicon.

5. The photonic chip of claim 1, wherein a width of the optical waveguide is decreased in a region where the optical tap is proximate to the optical waveguide.

6. The photonic chip of claim 1, wherein the optical tap is included in the semiconductor layer.

7. The photonic chip of claim 1, wherein the optical tap includes a polymer.

8. The photonic chip of claim 1, wherein the photonic chip includes one or more ring-resonator filters disposed between the optical waveguide and the optical tap.

9. The photonic chip of claim 1, wherein the carrier wavelength matches a target wavelength with a predefined accuracy without one of: thermal tuning, and electronic tuning.

10. The photonic chip of claim 9, wherein the predefined accuracy is 0.1 nm.

11. The photonic chip of claim 9, wherein the optical waveguide is trimmed so that the carrier wavelength matches the target wavelength within the predefined accuracy by oxidizing the semiconductor layer proximate to the optical waveguides; and
   wherein the amount of oxidation is specific to a given optical waveguide.

12. The photonic chip of claim 11, wherein the trimming modifies an effective index of refraction of the optical waveguide.

13. The photonic chip of claim 11, wherein the substrate includes a cavity, defined by an edge, through the substrate and the buried-oxide layer;
   wherein the optical waveguide is trimmed so that the carrier wavelength matches the target wavelength within the predefined accuracy by oxidizing the semiconductor layer proximate to the optical waveguide via the cavity; and
   wherein the amount of oxidation is specific to the optical waveguide.

14. The photonic chip of claim 13, wherein the trimming modifies an effective index of refraction of the optical waveguide.

15. The photonic chip of claim 1, further comprising a grating coupler optically coupled to the optical tap.

16. The photonic chip of claim 1, further comprising a cladding layer disposed on the semiconductor layer, wherein the cladding layer has a transmission coefficient exceeding a predefined value for at least a wavelength in an ultraviolet band of wavelengths.

17. The photonic chip of claim 1, wherein the substrate, the buried-oxide layer and the semiconductor layer constitute a silicon-on-insulator technology.

18. The photonic chip of claim 1,
   wherein the amount of trimming is specific to the optical waveguide.

19. A system, comprising:
   a processor;
   memory, coupled to the processor, that stores a program module; and
   a photonic chip, wherein the photonic chip includes:
      a substrate;
      a buried-oxide layer disposed on the substrate; and
      a semiconductor layer, disposed on the buried-oxide layer, that includes an optical waveguide that is configured to convey an optical signal having a carrier wavelength, wherein the optical waveguide is trimmed so that the carrier wavelength matches a target wavelength within a predefined accuracy without using a polymer; and an optical tap proximate and adjacent to the optical waveguide.

20. A method for trimming a carrier wavelength of an optical waveguide, the method comprising:

defining an optical tap proximate and adjacent to the optical waveguide in a photonic chip, wherein the optical waveguide is disposed on a buried-oxide layer on a silicon-on-insulator substrate, and wherein the optical tap is optically coupled to the optical waveguide;

measuring, using the optical tap, the carrier wavelength of an optical signal conveyed in the optical waveguide;

trimming the optical waveguide based on a difference between the measured carrier wavelength and a target wavelength so that the carrier wavelength matches the target wavelength within a predefined accuracy by oxidizing the semiconductor layer proximate to the optical waveguide, wherein the amount of oxidation is specific to the optical waveguide; and decreasing the optical coupling between the optical tap and the optical waveguide, so that the optical coupling is less than a predefined value.

* * * * *